US008777206B1

(12) United States Patent
Airosa

(10) Patent No.: US 8,777,206 B1
(45) Date of Patent: Jul. 15, 2014

(54) BUCKET HOLDER/MIXER SYSTEM

(76) Inventor: Frank L. Airosa, Tulare, CA (US)

( * ) Notice: Subject to any disclaimer, the term of this patent is extended or adjusted under 35 U.S.C. 154(b) by 0 days.

(21) Appl. No.: 13/487,654

(22) Filed: Jun. 4, 2012

(51) Int. Cl.
*B23Q 3/00* (2006.01)

(52) U.S. Cl.
USPC ......... 269/287; 248/213.2; 248/310; 248/500

(58) Field of Classification Search
USPC ........................ 269/287; 248/213.2, 310, 500
See application file for complete search history.

(56) References Cited

U.S. PATENT DOCUMENTS

| | | | | |
|---|---|---|---|---|
| 7,261,262 | B2 * | 8/2007 | Dunson | 248/154 |
| 8,011,701 | B2 * | 9/2011 | Taylor | 292/256 |
| 2007/0076519 | A1 * | 4/2007 | Kesling | 366/129 |

* cited by examiner

*Primary Examiner* — Lee D Wilson
*Assistant Examiner* — Shantese McDonald

(57) ABSTRACT

A platform is adapted to hold a bucket of paint. A pedal has a hinge coupled to the platform. A post has a lower end secured to the platform. A linkage has upper, lower, and central pins. The central pin pivotally couples the linkage to the post adjacent to the upper end. In this manner arcuate movement of the linkage about the central pin is facilitated. A connector couples the upper pin and the pedal. A spring couples the central pin and the pedal. A flexible strap is in a generally circular configuration. The strap is positionable around the bucket. The strap has a fixed end secured to the post. The strap has a free end coupled to the lower pin. In this manner lateral movement with the lower pin is allowed.

5 Claims, 3 Drawing Sheets

FIG. 1
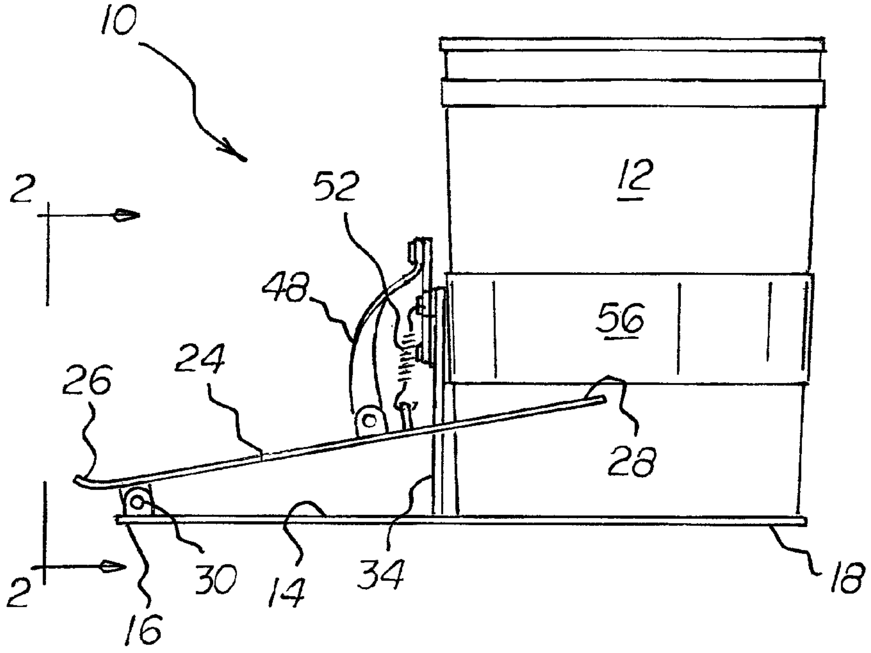
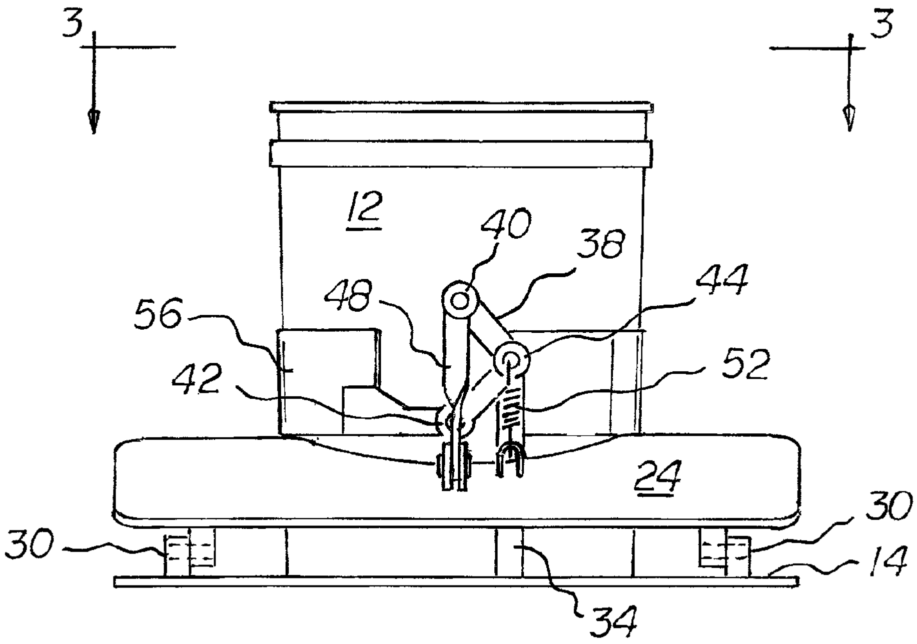
FIG. 2

FIG. 3
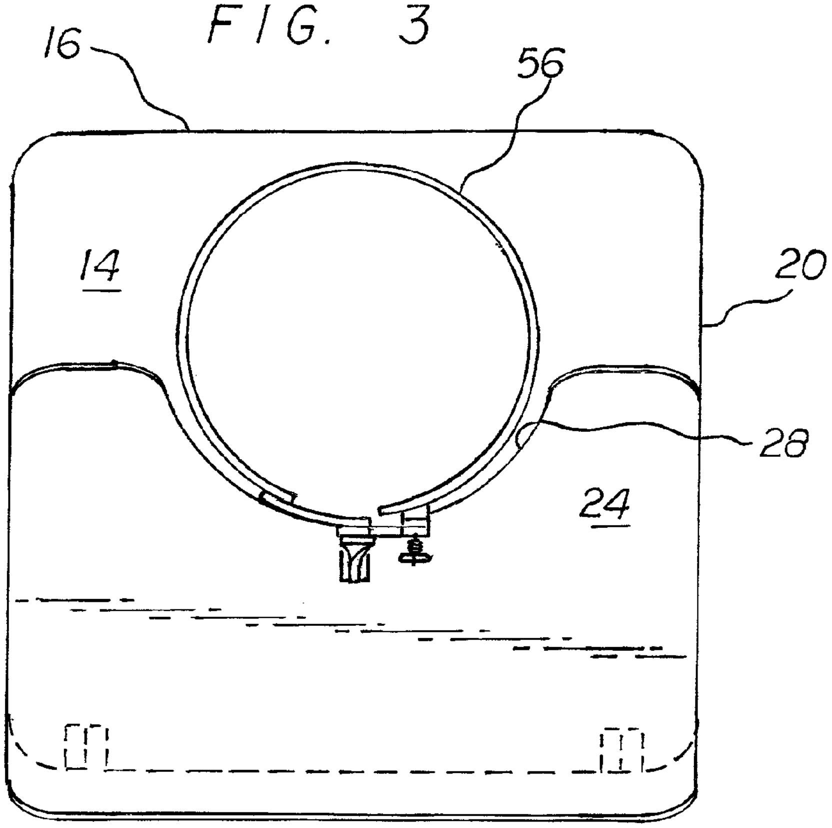
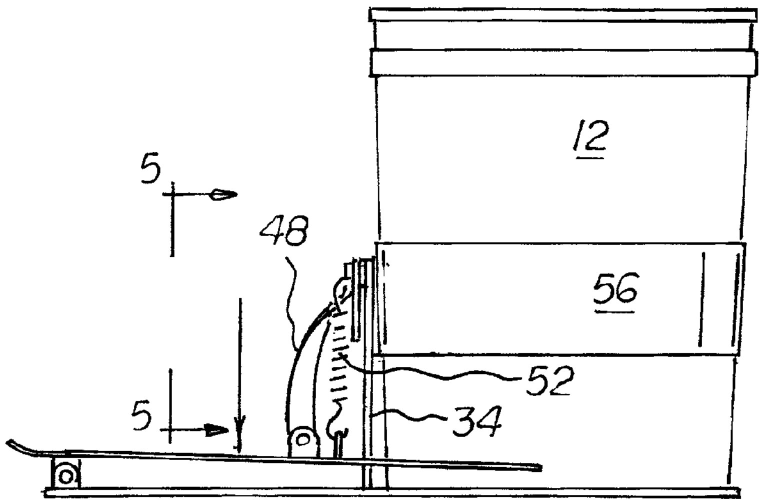
FIG. 4

FIG. 5
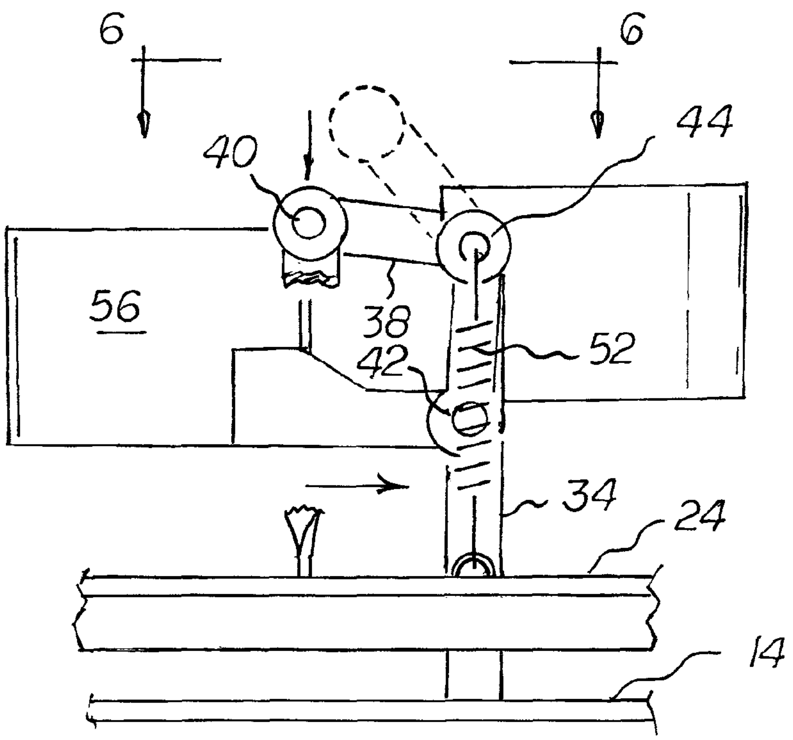
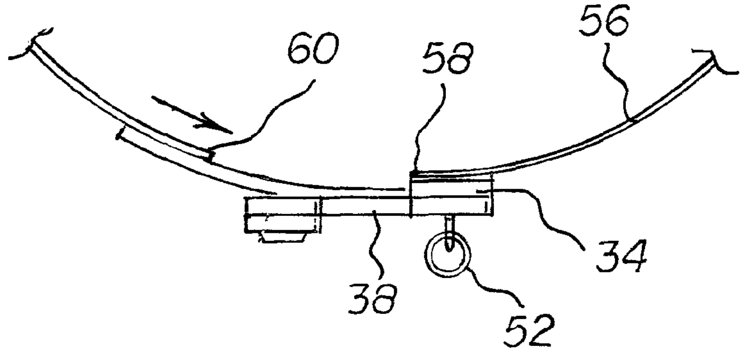
FIG. 6

BUCKET HOLDER/MIXER SYSTEM

BACKGROUND OF THE INVENTION

Field of the Invention

The present invention relates to a bucket holder/mixer system and more particularly pertains to holding a bucket 12 of paint while mixing the paint, for releasing the held bucket after mixing and for mixing paint in a bucket while being held, the holding and releasing an the mixing being done in a safe, neat, convenient and economical manner.

SUMMARY OF THE INVENTION

In view of the disadvantages inherent in the known types of bucket systems of known designs and configurations now present in the prior art, the present invention provides an improved bucket holder/mixer system. As such, the general purpose of the present invention, which will be described subsequently in greater detail, is to provide a new and improved bucket holder/mixer system and method which has all the advantages of the prior art and none of the disadvantages.

To attain this, the present invention essentially comprises a bucket holder/mixer system. A platform is adapted to hold a bucket of paint. A pedal has a hinge coupled to the platform. A post has a lower end secured to the platform. A linkage has upper, lower, and central pins. The central pin pivotally couples the linkage to the post adjacent to the upper end. In this manner arcuate movement of the linkage about the central pin is facilitated. A connector couples the upper pin and the pedal. A spring couples the central pin and the pedal. A flexible strap is in a generally circular configuration. The strap is positionable around the bucket. The strap has a fixed end secured to the post. The strap has a free end coupled to the lower pin. In this manner lateral movement with the lower pin is allowed.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved bucket holder/mixer system which has all of the advantages of the prior art bucket systems of known designs and configurations and none of the disadvantages.

It is another object of the present invention to provide a new and improved bucket holder/mixer system which may be easily and efficiently manufactured and marketed.

It is further object of the present invention to provide a new and improved bucket holder/mixer system which is of durable and reliable constructions.

An even further object of the present invention is to provide a new and improved bucket holder/mixer system which is susceptible of a low cost of manufacture with regard to both materials and labor, and which accordingly is then susceptible of low prices of sale to the consuming public, thereby making such bucket holder/mixer system economically available to the buying public.

Even still another object of the present invention is to provide a bucket holder/mixer system for holding a bucket 12 of paint while mixing the paint, for releasing the held bucket after mixing and for mixing paint in a bucket while being held, the holding and releasing an the mixing being done in a safe, neat, convenient and economical manner.

Lastly, it is an object of the present invention to provide a new and improved bucket holder/mixer system. A platform is adapted to hold a bucket of paint. A pedal has a hinge coupled to the platform. A post has a free upper end secured to the platform. A linkage has upper, lower, and central pins. The central pin pivotally couples the linkage to the post adjacent to the upper end. In this manner arcuate movement of the linkage about the central pin is facilitated. A connector couples the upper pin and the pedal. A spring couples the central pin and the pedal. A flexible strap is in a generally circular configuration. The strap is positionable around the bucket. The strap has a fixed end secured to the post. The strap has a free end coupled to the lower pin. In this manner lateral movement with the lower pin is allowed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a bucket holder/mixer system constructed in accordance with the principles of the present invention.

FIG. 2 is a side elevational view of the system taken along line 2-2 of FIG. 1.

FIG. 3 is a plan view of the system taken along line 3-3 of FIG. 2.

FIG. 4 is a side elevational view similar to FIG. 1 but with the pedal depressed.

FIG. 5 is a side elevational view of the system taken along line 5-5 of FIG. 4.

FIG. 6 is a plan view of the system taken along line 6-6 of FIG. 5.

The same reference numerals refer to the same parts throughout the various Figures.

DESCRIPTION OF THE PREFERRED EMBODIMENT

With reference now to the drawings, and in particular to FIG. 1 thereof, the preferred embodiment of the new and improved bucket holder/mixer system embodying the principles and concepts of the present invention and generally designated by the reference numeral 10 will be described.

The present invention, the bucket holder/mixer system 10 is comprised of a plurality of components. Such components in their broadest context include a platform, a pedal, a post, a linkage, a connector, a spring, and a flexible strap. Such components are individually configured and correlated with respect to each other so as to attain the desired objective.

First provided is a platform 14. The platform is in a generally rectangular configuration. The platform is positionable on a horizontal recipient surface. The platform has a front edge 16. The platform has a rear edge 18. The platform has side edges 20.

A bucket 12 of paint is provided. The bucket has a generally cylindrical side wall. The side wall has a perimeter. The bucket has a closed bottom. The bucket has an open top. The bottom and top are separated by a height. The bucket is removably positioned on the platform adjacent to the rear edge.

A pedal 24 is provided. The pedal has a near edge 26. The pedal has a far edge 28. The pedal has a hinge 30. In this manner the near edge of the pedal is coupled to the front edge of the platform. The far edge of the pedal is in an arcuate configuration. The far edge of the pedal is spaced from a portion of the bucket. The far edge of the pedal encompasses a portion of the bucket.

A fixed post 34 is provided. The post has a free upper end. The free upper end of the post is provided at an elevation adjacent to a central extent of the bucket. The fixed post has a lower end. The lower end of the fixed post is secured to the platform adjacent to the bucket.

An L-shaped two bar linkage 38 is provided. The linkage has an upper pin 40. The linkage has a lower pin 42. The linkage has a central pin 44. In this manner he linkage is held in a fixed configuration. The central pin pivotally couples the linkage to the post adjacent to the upper end. In this manner arcuate movement of the linkage about the central pin is facilitated. The upper pin is adapted to raise and lower when pivoting around the central pin. The lower pin is adapted to shift laterally when pivoting around the central pin.

A rigid connector 48 is provided. In this manner the upper pin and the pedal and the pedal are coupled. Further in this manner a user stepping on the pedal will rotate the linkage and laterally shift the lower pin.

A coil spring 52 is provided. In this manner the central pin and the pedal are coupled. Further in this manner the pedal is raised after the user removes a foot from the pedal following stepping on the pedal. The coil spring is located between the connector and the bucket.

A flexible strap 56 is provided. The strap is in a generally circular configuration. The strap is positionable around the bucket. The strap has a fixed end 58. The fixed end of the strap is secured to the post. The strap has a free end 60. The free end of the strap is coupled to the lower pin. In this manner, lateral movement is allowed with the lower pin. The strap has a periphery. The periphery of the strap is greater than the periphery of the bucket when the pedal is raised. In this manner the bucket may be introduced onto the platform or removed. The periphery of the strap is equal to the periphery of the bucket when the pedal is depressed by the user stepping on the pedal. In this manner the lower pin is laterally shifted. Also in this manner the perimeter of the strap is reduced. Further in this manner the bucket is secured to the platform.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A bucket holder/mixer system comprising:
- a platform adapted to hold a bucket of paint;
- a pedal having a hinge coupled to the platform;
- a post having a lower end secured to the platform;
- a linkage having upper and lower and central pins, the central pin pivotally coupling the linkage to the post adjacent to the upper end for facilitating arcuate movement of the linkage about the central pin;
- a connector coupling the upper pin and the pedal;
- a spring coupling the central pin and the pedal; and
- a flexible strap in a generally circular configuration positionable around the bucket, the strap having a fixed end secured to the post, the strap having a free end coupled to the lower pin for lateral movement therewith.

2. The system as set forth in claim 1 wherein the pins hold the linkage in a fixed configuration.

3. The system as set forth in claim 1 and further including:
- a bucket of paint removably positioned on the platform, the bucket having a generally cylindrical side wall with a perimeter, the bucket having a closed bottom and an open top separated by a height.

4. The system as set forth in claim 3 wherein the strap has a periphery greater than the periphery of the bucket when the pedal is raised whereby the bucket may be introduced onto the platform or removed therefrom, and the strap has a periphery equal to the periphery of the bucket when the pedal is depressed by the user stepping in the pedal to laterally shift the lower pin to reduce the perimeter of the strap whereby the bucket is secured to the platform.

5. A bucket holder/mixer system (10) for holding a bucket (12) of paint while mixing the paint, for releasing the held bucket after mixing and for mixing paint in a bucket while being held, the holding and releasing an the mixing being done in a safe, neat, convenient and economical manner, the system comprising, in combination:
- a platform (14) in a generally rectangular configuration, the platform being positionable on a horizontal recipient surface, the platform having a front edge (16) and a rear edge (18) and side edges (20);
- the bucket (12) of paint, the bucket having a generally cylindrical side wall with a perimeter, the bucket having a closed bottom and an open top separated by a height, the bucket removably positioned on the platform adjacent to the rear edge;

a pedal (24) having a near edge (26) and a far edge (28), a hinge (30) coupling the near edge of the pedal to the front edge of the platform, the far edge of the pedal being formed in an arcuate configuration spaced from and encompassing a portion of the bucket;

a fixed post (34) having a free upper end at an elevation adjacent to a central extent of the bucket, the fixed post having a lower end secured to the platform adjacent to the bucket;

an L-shaped two bar linkage (38), the linkage having an upper pin (40) and a lower pin (42) and a central pin (44), the pins holding the linkage in a fixed configuration, the central pin pivotally coupling the linkage to the post adjacent to the upper end for facilitating arcuate movement of the linkage about the central pin, the upper pin adapted to raise and lower when pivoting around the central pin, the lower pin adapted to shift laterally when pivoting around the central pin;

a rigid connector (48) coupling the upper pin and the pedal whereby a user stepping on the pedal will rotate the linkage and laterally shift the lower pin;

a coil spring (52) coupling the central pin and the pedal to raise the pedal after the user removes a foot from the pedal following stepping on the pedal, the coil spring being located between the connector and the bucket;

a flexible strap (56) in a generally circular configuration positionable around the bucket, the strap having a fixed end (58) secured to the post, the strap having a free end (60) coupled to the lower pin for lateral movement therewith, the strap having a periphery greater than the periphery of the bucket when the pedal is raised whereby the bucket may be introduced onto the platform or removed therefrom, the strap having a periphery equal to the periphery of the bucket when the pedal is depressed by the user stepping in the pedal to laterally shift the lower pin to reduce the perimeter of the strap whereby the bucket is secured to the platform.

* * * * *